United States Patent [19]

Shimizu et al.

[11] 4,060,390
[45] Nov. 29, 1977

[54] APPARATUS FOR PRODUCING COMPOSTS

[75] Inventors: Kazufusa Shimizu, Setagaya; Shigeo Katsumori, Minosato; Tadaaki Nishikawa, Hino; Keisaku Senoo, Onishi; Kenji Sakamaki, Funabashi; Makio Fujita, Gunma; Teruo Tano, Ota; Hiroshi Takano, Shibuya; Hideo Komori, Yokohama, all of Japan

[73] Assignees: Niigata Engineering Co., Ltd.; Seibu Chemical Industry Co., Ltd., both of Tokyo, Japan

[21] Appl. No.: 713,042

[22] Filed: Aug. 9, 1976

[30] Foreign Application Priority Data

Aug. 13, 1975 Japan .................................. 50-98239

[51] Int. Cl.² .............................................. C05F 9/02
[52] U.S. Cl. .......................................... 23/259.1; 71/9
[58] Field of Search ............... 195/127, 139, 142, 143; 71/8, 9, 15; 210/2, 11, 15, 205, 208, 523, 526, 219, 220; 23/259.1; 259/5, 6, 21, 22, 23, 40, 41, 97

[56] References Cited

U.S. PATENT DOCUMENTS

| 3,114,622 | 12/1963 | Hardy | 71/9 |
|---|---|---|---|
| 3,357,812 | 12/1967 | Snell | 71/9 |
| 3,438,740 | 4/1969 | Brown | 71/9 |

Primary Examiner—R. B. Penland
Attorney, Agent, or Firm—Wenderoth, Lind & Ponack

[57] ABSTRACT

An apparatus for producing well-fermented compost by achieving an aerobic fermentation of organic wastes, excretion, etc. The apparatus comprises a fermentation vessel of a rectangular configuration, a device for feeding slurry-like organic wastes within the base compost which has been piled in the vessel and for stirring the base compost and the slurry-like organic wastes, and a device for gathering an upper portion of the predetermined thickness of the fermented compost and for carrying the gathered compost out of the vessel. These devices are movably positioned on the top of the vessel.

7 Claims, 9 Drawing Figures

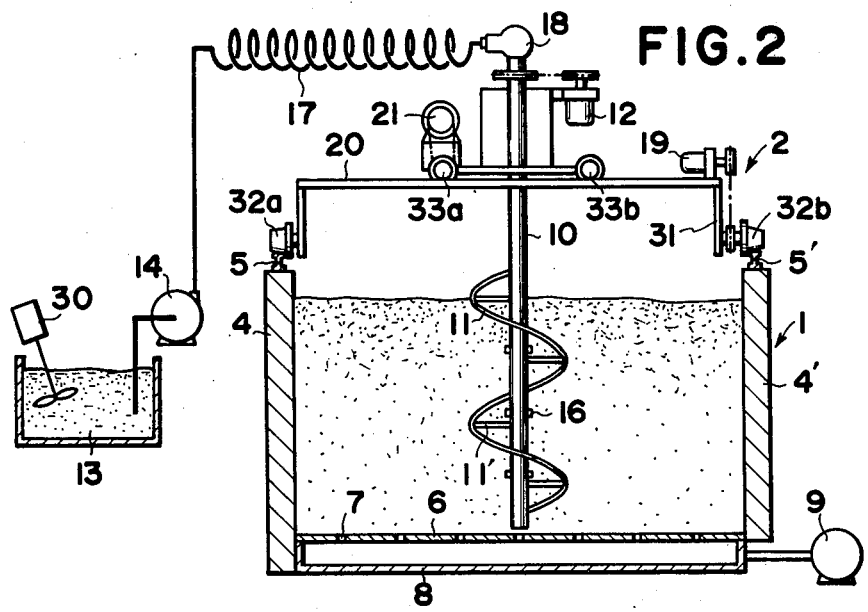
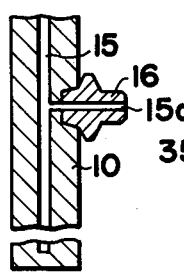
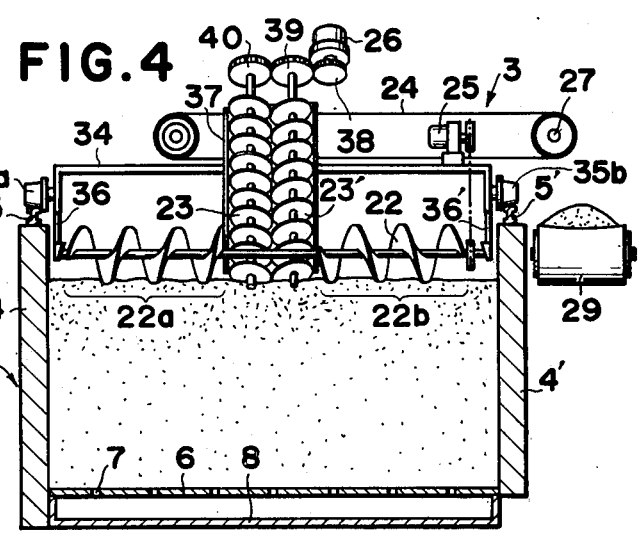

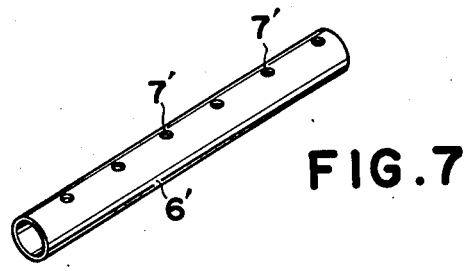
FIG.7
FIG.8
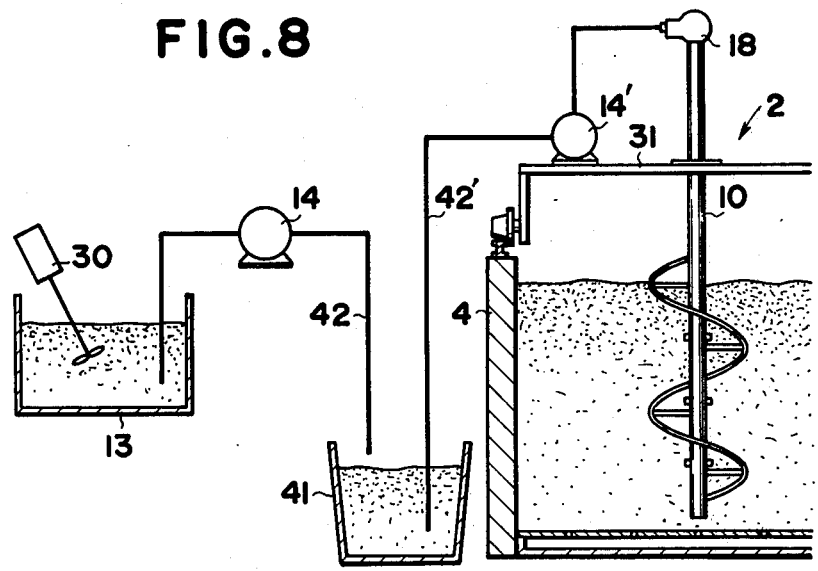

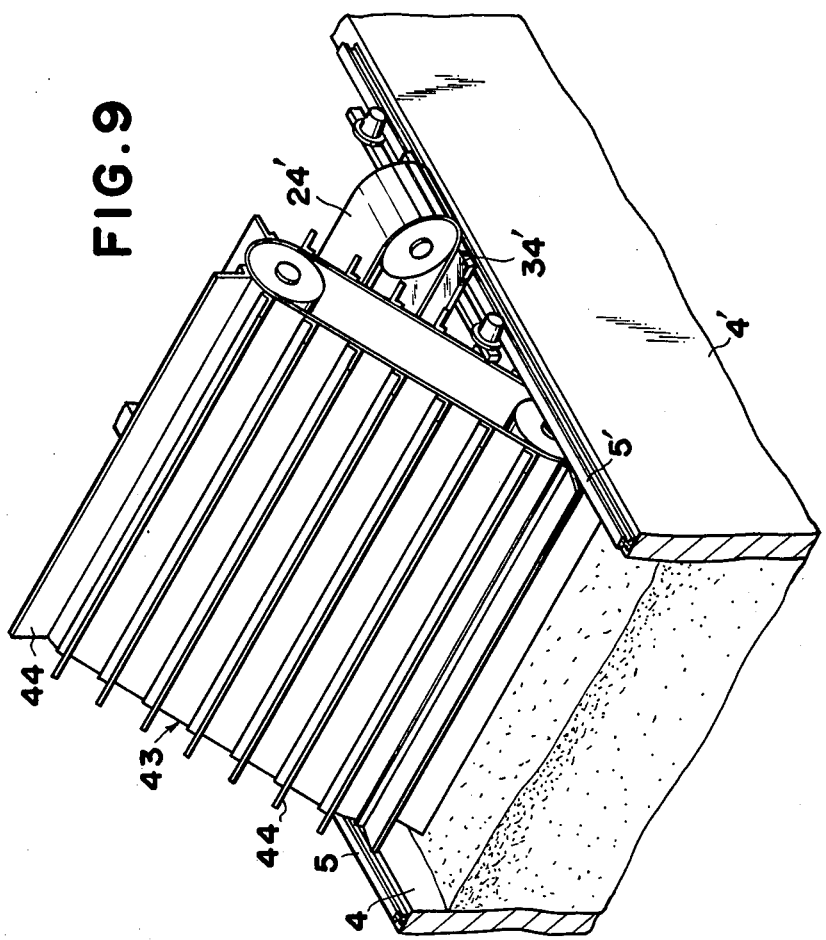

APPARATUS FOR PRODUCING COMPOSTS

BACKGROUND OF THE INVENTION

The present invention relates to an apparatus for producing compost by achieving an aerobic fermentation of organic wastes and excretions, which are of relative fluidity or high water content, such as a mixture of feces and urine of domestic animals.

Conventionally, rotary kilns have been used wherein organic wastes are aerobically fermented to produce compost. However, the conventional apparatus has presented some serious disadvantages in that a great number of rotary kilns, which are expensive must be installed when a further amount of organic wastes are treated since there is a definite limitation in constructing large-scaled kilns. Further, after the kilns are formed on a larger scale, the predetermined large amount of wastes should always be treated in order to keep the desired fermentation condition within the kilns. Thus, the kilns in the conventional art are almost inapplicable to variations in volume of the wastes to be treated.

On the other hand, an attempt has been made recently in which piled organic wastes are circulated within an annular groove to achieve an aerobic fermentation of wastes during circulation. In the attempt, the piled organic wastes, which have been supplied into the preformed annular groove for fermentation, are circularly transferred along the groove by means of rotary stirrers and the fermentation and a natural drying are carried out during such circulation. After the natural drying is completed to obtain compost which contains water of about 20% by weight, a part of the naturally dried compost is delivered out of a predetermined position of the groove, and then crude or unfermented organic wastes are additionally supplied onto the remanent compost in the groove. Then, another stirring is done while the mixture of the newly supplied organic wastes and the remanent compost are circularly transferred along the groove for another fermentation.

In this annular groove type apparatus, disadvantageous problems have also appeared in that the apparatus should have an annular groove having an extraordinarily large area since an aerobic fermentation is generally restricted to a piling height of, at most, about 50 cm. Thus, if the height of the mixture of the residual fermented composts and the crude organic wastes exceeds about 50 cm, the desired aerobic fermentation will no longer be effected. Further, the conventional apparatus, in which the mixture to be fermented is not only stirred but is also transferred along the groove, requires considerable power for transferring the mixture, particularly when a great amount of mixture is treated. Moreover, the conventional apparatus requires an additional element such as housing or casing which covers the whole structure of the apparatus to maintain the fermentation temperature and prevent terrible odors.

Accordingly, an object of the present invention is to provide a novel apparatus for producing compost, which allows an efficient fermentation.

Another object of the present invention is to provide an apparatus for producing compost, which allows a desired aerobic fermentation even when the material to be fermented is piled one meter high and more.

A further object of the present invention is to provide an apparatus for producing composts, which provides a stirring and mixing step, an aerobic fermentation step and drying step within a single vessel, without transferring all of the piled mixture.

DESCRIPTION OF THE DRAWINGS

FIG. 2 is a partly sectioned side view of elements in the first embodiment shown in FIG. 1;

FIG. 3 is an enlarged sectioned view of a part of the element shown in FIG. 2;

FIG. 4 is a partly sectioned side view of other elements in the first embodiment shown in FIG. 1;

FIG. 7 is an enlarged perspective view of a part of the pipe shown in FIG. 6;

FIG. 8 is a partly sectioned side view of elements in another embodiment of the present invention; and FIG. 9 is a perspective view of another embodiment of the present invention.

DETAILED DESCRIPTION OF THE INVENTION

Figure 1:
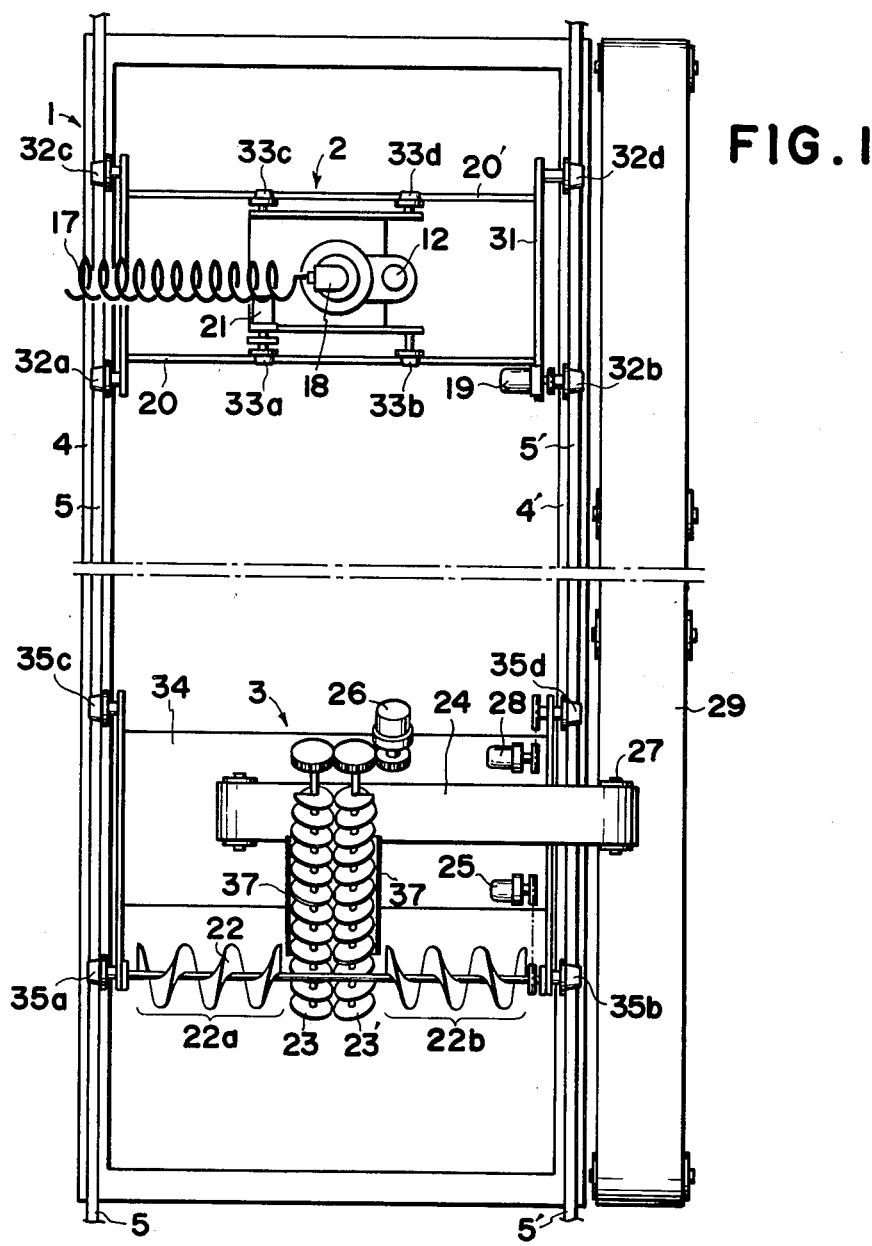
FIG. 1 is a top plan view of the apparatus according to a first embodiment of the present invention.

In the drawings, like reference numerals represent like parts in the different views of the drawings.

In FIGS. 1, 2, 3 and 4 which show a first embodiment of the present invention, a fermentation vessel 1 of iron plate of a rectangular box-shaped configuration is provided which has, for example, a length of 50 m., a width of 2.5 m. and a depth of 2 m, and a top face of which is opened. Above the vessel 1 are a device 2 for feeding slurry-like organic wastes and a device 3 for scratching or gathering an upper portion of the predetermined thickness of fermented compost within the vessel 1 and carrying the compost out of the vessel. The devices 2 and 3 are described later in detail. The vessel 1 has, on top of side walls 4 and 4' thereof, rails 5 and 5' so that the aforesaid devices 2 and 3 may be moved along the rails 5 and 5'. The vessel 1 has a base plate 8 and a perforated plate 6 above the base plate 8 with an air space therebetween. A perforated plate 6 has a plurality of minor through-holes 7 and is disposed in parallel to the base plate 8. A blower 9, which is schematically illustrated in FIG. 2, because it may be of any type of device for supplying an air into the air space formed between the two plates 6 and 8, is provided adjacent to the base plate 8 and is communicated with the air space by means of a suitable conduit.

Adjacent the vessel 1, there is provided a container of slurry-like organic wastes 13, a pump 14 and a stirrer 30 which are illustrated in a mere schematic diagram for the sake of convenience since these may be of any known type or configuration.

Referring particularly to FIG. 2 which shows the device 2 for feeding and stirring the slurry-like organic wastes, the device 2 has a movable body 31 which has a driving motor 19 and four wheels 32a, 32b, 32c and 32d so that the movable body 31 may be reciprocated along the rails 5 and 5' in the longitudinal direction of the vessel 1 by means of the driving motor 19. Rotation of the driving motor 19 is delivered to the wheels 32a through 32d by known suitable means. The movable body 31 has rails 20 and 20' on the top thereof so that a stirring shaft 10, which will be described below in detail, may be traversed along the rails 20 and 20' in the direction at a right angle to the traversing direction of the movable body 31.

The stirring shaft 10 extends downwardly into the vessel and has a spiral band or ribbon member 11 for the purpose of stirring the wastes piled in the vessel 1 and a driving motor 12 for rotating the shaft 10. The spiral band member 11 is attached to the shaft 10 through a plurality of arms 11' and is wound around the lower portion of the shaft 10. The shaft 10, as shown in FIG. 3, has a passage 15 which has an opening at the top end of the shaft 10 but is closed at the bottom, and a single or a plurality of branch passages 15a which are communicated with the passage 15 and have openings at the side of the shaft 10. Preferably, a nozzle 16 may be fixed to the openings of the respective branch passage 15a for the purpose of an effective injection of the slurry-like organic wastes into the piled compost in the vessel 1. The branch passages 15a may be extended, if necessary, to the inside of the spiral band member 11 through the arm members 11' to thereby inject the slurry-like wastes from openings formed on the spiral band member 11.

The shaft 10 in the embodiment shown in FIGS. 1 and 2 has wheels 33a, 33b, 33c and 33d and a driving motor 21 so that the shaft 10 with the spiral band member 11 may be traversed along the rails 20 and 20' on the movable body 31. On top of the shaft 10 is a rotary joint 18 which is pivotably mounted and is communicated with the aforesaid pump 14 through a resilient coiled conduit member 17 so that the organic wastes contained in the container 13 and stirred by the stirrer 30 into a slurry-like can be through the conduit member 17, the rotary joint 18, the shaft 10 and then into the vessel 1.

Referring now to FIG. 4 which shows a gathering device 3 in a preferred embodiment of the present invention, the device 3 has a movable body 34 which has four wheels 35a, 35b, 35c and 35d, though two of which are not shown in the drawing, so that the frame 34 may be movable by means of a motor 28 (shown in FIG. 1) along the rails 5, 5' on the vessel 1. A screw conveyor 22 which has a length slightly shorter than the distance between the walls 4 and 4' of the vessel is, at the ends thereof, suspended from the movable body 34 by means of members 36 and 36'. The members 36 and 36' are connected to the movable body 34 but are slidable in the vertical direction so that the level of the screw conveyor 22 may be adjusted in accordance with the height of the compost in the vessel 1. The screw conveyor 22 has a screw part 22a and a screw part 22b which is of spiral configuration opposite to that of the screw part 22a so that the fermented composts are gathered toward a center of the screw conveyor 22 when the screw conveyor 22 is driven by a motor 25 positioned on the movable body 34.

At the center of the screw conveyor 22, is a set of screw conveyors 23 and 23', which are opposite each other in parallel and inclined toward a belt conveyor 24 which is positioned on the movable body 34 and is driven by a motor 27. The screw conveyors 23 and 23' are covered by a cylindrical member 37 which prevents the composts from dropping out of the screw conveyors 23 and 23'. The screw conveyors 23 and 23' are simultaneously driven by a motor 26 through toothed wheels 38, 39 and 40 so that the screw conveyor 23 is rotated in one direction while the screw conveyor 23' is in rotated another direction.

Adjacent and parallel to the wall 4' of the vessel 1, is a belt conveyor 29 which is, for example, as long as the longer walls 4 and 4' of the vessel 1, as shown in FIG. 1.

Here, care should be taken to insure that the rails 5 and 5' disposed on the walls 4 and 4' of the vessel 1 are longer than the wall 4 and 4' so that one of the devices 2 and 3 may be positioned outside of the vessel 1 while the other is being operated with respect to the full area of the vessel 1.

The devices 2 and 3 are separately positioned on the separate movable bodies 31 and 34, respectively, in the above-described embodiment, but both devices 2 and 3 may be located on a single movable body which has four wheels, though that is not shown in the drawings.

The driving motors 19 and 28 are provided in the above-described embodiment for driving the movable bodies 31 and 34, respectively. However, the movable bodies 31 and 34, may be reciprocated along the rails 5 and 5' by pulling them by using other pulling power, without providing the driving motors 19 and 28 on the movable bodies.

Figure 5:
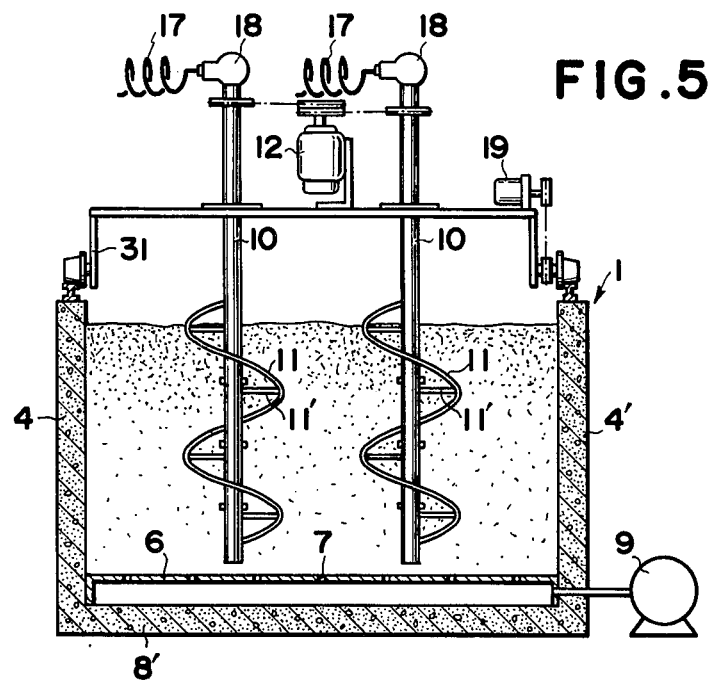
FIG. 5 is a partly sectioned side view of another embodiment of the present invention.

In another embodiment of the present invention shown in FIG. 5, two stirring shafts 10 are provided; both are fixed to a movable body 31. When two or more stirring shafts are provided, the driving motor 21, rails 20 and 20', and wheels 33a, 33b, 33c and 33d are unnecessary, since each stirring shaft may be rotated at its fixed position without traversing the movable body 31. The stirring shafts 10 in FIG. 5 are rotated by a motor 12. The vessel 1, namely four vertical walls 4 and 4' and a base plate 8', is integrally made of concrete. The other elements as well as the stirring shafts 10, movable body 31 and motor 12 are quite similar to the embodiment shown in FIGS. 1, 2 and 3, and no detailed description will be made.

Figure 6:
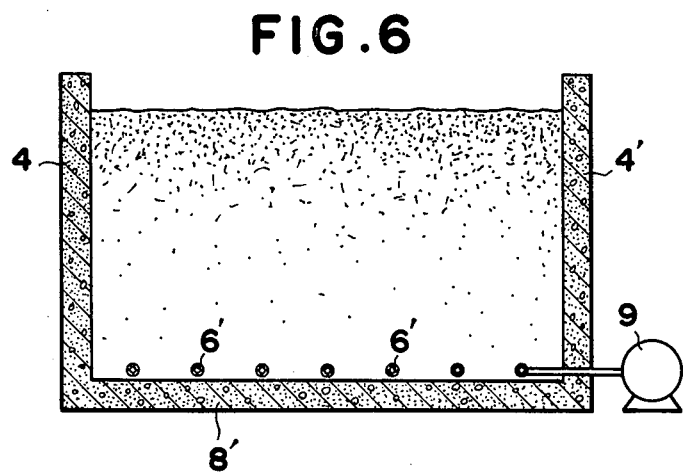
FIG. 6 is a partly sectioned view of the apparatus in another embodiment of the present invention, showing a plurality of pipes within a vessel.

A further embodiment of the present invention shown in FIGS. 6 and 7, a plurality of pipes 6' communicating with one another are disposed on the base plate 8' in place of the perforated plate 6 of the aforementioned embodiment shown in FIG. 5. The pipes have, as shown in FIG. 7, holes 7' and are connected to an air compressor or a blower 9. Other construction and elements are similar to the embodiment shown in FIGS. 1, 2, 3 and 4, and no detailed description will be made.

In FIG. 8 which shows another embodiment of the present invention, an additional container or trough 41 is disposed by the side of the wall 4 of the vessel 1. The trough 41 is as long as the length of the vessel 1. In this embodiment, an additional pump which is illustrated by reference numeral 14' is provided on the movable body 31 of the device 2. The organic wastes which are stirred by the stirrer 30 within the container 13 are supplied by the pump 14 into the trough 41 through a conduit tube 42, and then the slurry-like organic wastes in the trough 41 are suctioned by the pump 14' through another conduit tube 42' which is movable in the lengthwise direction of the trough together with the movable body 31. The thus suctioned wastes are fed into the piled compost, which has remained in the vessel 1, in a manner similar to the embodiment shown in FIG. 2. The embodiment shown in FIG. 8 is desired particularly when the vessel 1 is constructed in a large scale such that the vessel 1 is several tens of meters long.

FIG. 9 shows another embodiment of the present invention. In this embodiment, a scraper conveyor 34 which has a plurality of nail members 44 at the predetermined intervals on the outer surface thereof is disposed on a movable body 34' in place of the screw conveyors 22, 23 and 23' of FIG. 3. The scraper conveyor 43 has a width substantially the same as, or slightly smaller than, the inner distance between the walls 4 and 4', and is inclined toward a belt conveyor 24' which is similar to the belt conveyor 24 of FIG. 4, but is long enough to bridge over the walls 4 and 4'. The construction is quite similar to the embodiment shown in FIGS. 1 and 4, and no detailed description will be made.

A mode of operation will be described hereinafter with reference to the embodiment shown in FIGS. 1 through 4.

First of all, completed compost which has been produced by any of the conventional methods is piled as a base material within the fermentation vessel 1 as high as, for example, about 1.5 m. whereas the depth of the vessel 1 is about 2 m. The base compost may contain water of about 10 – 40% by weight.

A crude mixture of feces and urine of domestic animals is supplied into the container 13 and stirred by the stirrer 30 to form a substantially homogeneous slurry-like organic mixture. By using the pump 14 the slurry-like mixture, which contains water of about 85% by weight at this stage, is delivered to the passage 15 of the stirring shaft 10 through the coiled conduit member 17 and the rotary joint 18, and then into the base compost in the vessel 1 by way of the branch channels 15a. Namely, the slurry-like mixture is injected or poured into the base compost which previously has been piled in the vessel 1.

At the same time as injecting the slurry-like mixture into the bast compost, the stirring shaft 10 is rotated at the speed of 50 – 100 rpm, and the stirring shaft 10 together with the movable body 31 is traversed along the rails 5 and 5' at the speed of 0.5 – 6.0 meters per minute while the shaft 10 is traversed by the motor 21 in the direction with a right angle to the aforesaid traversing direction of the movable body 31. Thus, the stirring shaft 10 is rotated while the same is moved in a zig-zag manner, and the base composts and the newly injected slurry-like mixture are stirred and uniformly mixed.

In general, an aerobic fermentation is preferably and effectively proceeded and achieved when the water content of the materials to be fermented is within the range of about 50 – 65% by weight. The high water content material such as the mixture of feces and urine cannot be aerobically fermented just as it is. In this respect, according to the apparatus of of the present invention, an upper portion of the predetermined thickness of the fermented compost is scratched and gathered up, whereas the remanent compost is always positioned within the vessel 1 as the base material. Therefore, the desired mixture which contains water of about 50 – 65% by weight can be easily prepared by merely pouring a high water content crude mixture into the remanent or base composts.

Referring back to FIGS. 1 through 4, after the base compost and the slurry-like mixture are well mixed by rotating the stirring shaft 10, the resultant mixture is left as it is for about 72 hours to 120 hours to form fermented compost, and during the fermentation period air is compressed into the vessel 1 through the perforated plate 6 by means of the blower 9 to achieve an effective fermentation of the mixture. The device 2 which has the stirring shaft 10 may be suitably traversed by driving the motor 19 while the stirring shaft 10 is being rotated by the motor 12 during that period to accomplish further effective fermentation of the mixture. If necessary, heated air may be supplied by the blower 9 into the vessel 1 at an initial stage of fermentation so that a rapid fermentation may be facilitated.

Thus, well-fermented compost is obtained which contains water of about 30 – 40% by weight. If necessary, the blower 9 is further driven to supply an air or heated air into the vessel 1 to obtain dried compost which contains water of about 10 – 20% by weight.

After the well-fermented compost is produced, the motors 25, 26 and 28 are simultaneously driven so that the screw conveyors 22, 23 and 23' are rotated while the device 3 is moved along the rails 5 and 5'. The screw conveyor 22, which can be shifted upward or downward by adjusting the length of the members 36 and 36' which suspend the screw conveyor 22 at the ends thereof, scratches and gathers the upper part of the compost toward the set of screw conveyors 23 and 23'. The scratched and collected compost is then delivered to the belt conveyor 24 through the screw conveyors 23 and 23'. Then, the compost is delivered to the belt conveyor 29 which is installed at the side of the vessel as shown in FIG. 1.

After the upper portion of the predetermined depth, for instance about 10 – 20 cm, of the fermented compost is removed from the vessel 1 by the device 3, the device 3 is moved out of the vessel, and then the device 2 is again operated to supply the crude slurry-like mixture into the vessel through the nozzles 16 of the stirring shaft 10 such that the crude mixture is supplied within the remanent compost, and to stir and mix the remanent with the newly supplied crude mixture for the sake of further production of compost.

The quantity of the remanent may be selected in accordance with the quantity of the crude mixture to be supplied and a water content in the crude mixture.

According to the apparatus of the present invention, an efficient fermentation can be achieved in comparison with the conventional apparatus in this field. Further, a desired aerobic fermentation can be achieved even when the material to be fermented is piled higher than in the conventional devices, and therefore, the area occupied by the vessel 1 can be made smaller. Moreover, all of the steps of supplying the crude mixture, stirring and mixing the crude excretion and the remanent composts, fermentation and drying can be accomplished within the single vessel 1 without transferring all of the piled mixture. Accordingly the apparatus does not require large power for transferring the mixture.

Additionally, since the crude mixture is poured or supplied within the remanent compost, evil odor can be minimized.

Although the present invention has been described with reference to the preferred embodiments thereof, many modifications and alterations may be made within the spirit of the present invention.

For instance, the perforated plate 6 shown in FIG. 1 may be replaced by a net or meshed member of metal. Moreover, a heat insulation material may be inserted inside of wall of the fermentation vessel in order to keep a desired fermentation temperature.

What is claimed is:

1. An apparatus for producing compost from a base compost mixture of previously fermented compost, and a slurry-like organic waste mixture added to said base compost, said apparatus comprising:
   a fermentation vessel containing said base compost therein, said vessel having a base plate, vertical side walls and end walls extending upward from said base plate, and an open top;

feeding and stirring means for feeding said slurry-like organic waste within said base compost in said fermentation vessel and for simultaneously stirring said base compost and said slurry-like organic waste, said feeding and stirring means comprised of:
  at least one rotatable stirring shaft member extending downwardly into said vessel, said shaft member having a passage therethrough which said slurry-like organic wastes are fed within said base compost, and
  spiral member means fixed around the outside of said rotatable shaft for mixing said base compost and said slurry-like organic waste;
air supply means at the base of said fermentation vessel for supplying air into said fermentation vessel, whereby said mixture of base compost and said slurry-like organic wastes is aerobically fermented; and
gathering and carrying means at the top of said fermentation vessel above said mixture of base compost and organic waste for gathering an upper portion of predetermined thickness of said mixture, and carrying said gathered mixture out of and away from said fermentation vessel, said gathering and carrying means comprised of:
  first conveying means mounted across the top of said fermentation vessel having a length substantially the same as the width of the fermentation vessel for gathering the upper portion of said mixture, and
  second conveying means adjacent said first conveying means for carrying said mixture away from said fermentation vessel;
said feeding and stirring means and said gathering and carrying means being movable in the longitudinal direction along the top of said fermentation vessel.

2. An apparatus as claimed in claim 1, wherein:
said feeding and stirring means is further comprised of:
  a first movable body reciprocably movable in the longitudinal direction along the top of said fermentation vessel, and
  pumping means connected to said stirring shaft member for delivering said slurry-like organic waste through said passage in said stirring shaft member and into said base compost; and
  wherein said stirring shaft extending downwardly from said first movable body into said vessel is rotatable and is reciprocally movable on said first movable body at a right angle to the longitudinal length of said vessel.

3. An apparatus as claimed in claim 1 wherein:
a plurality of stirring shaft members extend downwardly into said vessel, each shaft member having a passage therethrough through which said slurry-like organic wastes are fed within said base composts;
said feeding and stirring means is further comprised of:
  a first movable body reciprocably movable in the longitudinal direction along the top of said fermentation vessel, and
  pumping means connected to said stirring shafts for delivering said slurry-like organic waste through said passages in said stirring shafts and into said base compost and
  said stirring shaft members are rotatably mounted on said first movable body.

4. An apparatus as claimed in claim 1 wherein said first conveying means is comprised of:
  a second movable body positioned across the top of said fermentation vessel and reciprocably movable in the longitudinal direction of said vessel;
  first screw conveyor means connected to and hanging downward from said movable body toward said compost mixture and having a length substantially the same as the width of said vessel and provided for gathering an upper portion of predetermined thickness from said compost mixture, said first screw conveyor means having two opposed spiral parts directed toward the center thereof;
  second screw conveyor means positioned at the center of said first screw conveyor means, said second screw conveyor means having two opposite spiral portions inclined upwardly; and
  a belt conveyor mounted on said second movable body beneath the upper end of said upwardly inclined second screw conveyor means, whereby said upper portion of said compost mixture gathered by said first and second screw conveyor means and said belt conveyor is carried out of said fermentation vessel.

5. An apparatus as claimed in claim 1 wherein said first conveying means is comprised of:
  a second movable body positioned across the top of said fermentation vessel and reciprocably movable in along the longitudinal direction of said vessel;
  a belt conveyor mounted across said second movable body; and
  scraper conveyor means inclined upwardly toward said belt conveyor and having a width substantially the same as said vessel and having a plurality of nail members on the outer surface thereof for scraping and gathering the upper portion of said compost mixture and delivering said gathered portion to said belt conveyor.

6. An apparatus as claimed in claim 1, wherein said air supply means is comprised of:
  a perforated plate spaced above said base of said vessel; and
  air blower means communicated with said space between said base and said perforated plate for supplying air into said vessel through said space and said perforated plate.

7. An apparatus as claimed in claim 1 wherein said air supply means is comprised of:
  a plurality of pipes positioned across the base of said vessel, said pipes having a plurality of holes through the upper portion thereof; and
  air blower means communicated with said pipes for supplying air into said vessel through said pipes.

* * * * *